(12) United States Patent
Wimmer et al.

(10) Patent No.: US 10,978,836 B2
(45) Date of Patent: Apr. 13, 2021

(54) HOUSING ELEMENT, ELECTRIC LINE ARRANGEMENT, AND PRODUCTION METHOD THEREFOR

(71) Applicant: Lisa Draexlmaier GmbH, Vilsbiburg (DE)

(72) Inventors: Wolfgang Wimmer, Salching (DE); Thomas Stöckl, Pfeffenhausen (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 0 days.

(21) Appl. No.: 16/483,266

(22) PCT Filed: Jan. 29, 2018

(86) PCT No.: PCT/EP2018/052056
§ 371 (c)(1),
(2) Date: Aug. 2, 2019

(87) PCT Pub. No.: WO2018/141668
PCT Pub. Date: Aug. 9, 2018

(65) Prior Publication Data
US 2019/0379169 A1    Dec. 12, 2019

(30) Foreign Application Priority Data
Feb. 3, 2017   (DE) ..................... 10 2017 102 130.2

(51) Int. Cl.
*H01R 24/20*      (2011.01)
*H01R 4/02*       (2006.01)
(Continued)

(52) U.S. Cl.
CPC ............. *H01R 24/20* (2013.01); *H01R 4/029* (2013.01); *H01R 13/506* (2013.01);
(Continued)

(58) Field of Classification Search
CPC .... H01R 25/168; H01R 25/142; H01R 25/16; H01R 25/161; H01R 25/162; H01R 31/06; H01R 2201/26; H02G 5/00; Y10S 439/949
See application file for complete search history.

(56) References Cited

U.S. PATENT DOCUMENTS 4,740,167 A * 4/1988 Millhimes .............. H01R 31/00
                                                      439/170
6,835,089 B2 * 12/2004 Hayes ................. B60R 13/0225
                                                      174/88 R
(Continued)

FOREIGN PATENT DOCUMENTS

DE    10 2011 089978 A1    6/2013
DE       102015220115      4/2017
(Continued)

OTHER PUBLICATIONS

Translation of DE102010014916.
(Continued)

*Primary Examiner* — Vanessa Girardi
(74) *Attorney, Agent, or Firm* — BelayIP; Jacob Eisenberg

(57) ABSTRACT

A housing element for attachment to an electric flat conductor rail. The housing element includes a flat conductor socket extending in a first direction, and a plug connector flange extending in a second direction transverse to the first direction, and including an interior contact part receptacle. The plug connector flange is further separated from the flat conductor socket by a wall. A passage opening connects the flat conductor socket to the contact-part receptacle. The present disclosure further relates to an electric line arrangement including such a housing element and to a production method therefor.

20 Claims, 2 Drawing Sheets

(51) Int. Cl.
*H01R 13/506* (2006.01)
*H01R 13/52* (2006.01)
*H01R 43/02* (2006.01)
*H01R 43/18* (2006.01)

(52) U.S. Cl.
CPC ......... *H01R 13/5202* (2013.01); *H01R 43/02* (2013.01); *H01R 43/18* (2013.01)

(56) References Cited

U.S. PATENT DOCUMENTS

| | | | | |
|---|---|---|---|---|
| 7,649,731 | B2 * | 1/2010 | Parrish | B60R 16/0238 361/624 |
| 9,711,875 | B2 * | 7/2017 | Ooba | H01R 43/0207 |
| 2018/0170189 | A1 | 6/2018 | Ulrich et al. | |

FOREIGN PATENT DOCUMENTS

| | | |
|---|---|---|
| DE | 102016103439 | 8/2017 |
| DE | 10 2016 107080 A1 | 10/2017 |
| DE | 10 2016 116563 A1 | 3/2018 |
| DE | 10 2016 124 963 A1 | 6/2018 |

OTHER PUBLICATIONS

Translation of DE102016103439.
Office Action in German Application No. 10 2017 102 130.2, dated Oct. 6, 2017, 2 pages.
Office Action in German Application No. 10 2017 102 130.2, dated Jul. 18, 2018, 3 pages.
International Search Report, International Application No. PCT/EP2018/052056, dated May 4, 2018, 14 pages.

* cited by examiner

US 10,978,836 B2

HOUSING ELEMENT, ELECTRIC LINE ARRANGEMENT, AND PRODUCTION METHOD THEREFOR

CROSS-REFERENCE TO RELATED APPLICATION

This application is a national phase of International Application No. PCT/EP2018/052056, filed on Jan. 29, 2018, which claims priority to German Patent Application No. 10 2017 102 130.2, filed on Feb. 3, 2017. The contents of the above-referenced applications are expressly incorporated herein by reference to their entireties.

TECHNICAL FIELD

The present invention relates to a housing element for a attachment to an electric flat conductor rail. The invention further relates to an electric line arrangement for a vehicle having a flat conductor rail, as well as to a housing for an electrical contact part, and to a method for producing such a line arrangement.

BACKGROUND

From the prior art, housing elements for electric line arrangements having an essentially dimensionally stable flat conductor rail for use in a vehicle are already known.

One such flat conductor rail can, as disclosed, for instance, in DE 10 2015 220 115 A1 published after the filing date of the present application, can be installed in a vehicle, for instance as a part of a central electrical energy supply system. For example, a flat conductor rail, as a ground wire or supply line, can extend between a front and rear area of the vehicle. For linking vehicle electrical loads, lateral taps, that is, taps protruding transversely to the longitudinal direction of the flat conductor rail, that have electrical contact parts are used. Via these contact parts, a ground return, for instance to the ground terminal of a vehicle battery, can be accomplished from the loads, or a supply of the loads can be accomplished for instance through the vehicle battery, a vehicle generator, a direct-voltage converter, or the like.

For instance, DE 10 2016 116 563 A1, also published after the filing date of the present application, describes a housing element as part of a housing in which an electric conductor, embodied as a flat conductor rail, and a contact part that contacts the flat conductor rail can be received. The housing has a housing cap and a housing element, provided as a housing base, which are connected to one another pivotably via a hinge. For making contact with the contact part, a conductor is introduced into the housing to the contact part and connected there directly to the contact part.

A different housing is also known from DE 10 2016 103 439 A1, also published after the filing date of the present application. In it, a contact part, which is connected to a flat conductor rail in a connection region, is located in a multi-shell housing. The housing is in turn secured to the flat conductor rail. Here as well, a conductor which for instance is relatively flexible is again introduced into the housing and connected there directly to the contact part.

Since the flat conductor rails are used more and more often as a central energy supply system in vehicles, electric conductors must accordingly be guided to the flat conductor rail for the sake of making contact. However, in this respect it would be desirable if existing versions of plug connectors, which until now have had flexible conductors, could be used with flat conductor rails as well.

DESCRIPTION OF THE DISCLOSURE

One object of the invention is therefor, while using means that are structurally as simple as possible, to create a possibility of being able to connect existing plug connector versions to a flat conductor rail.

This object is attained by the subjects of the independent claims. Advantageous refinements of the invention are disclosed in the dependent claims, the specification, and the accompanying drawings.

A housing element according to the invention for attachment to an electric flat conductor rail is injection molded from a plastic material and is particularly suitable as a housing base, that is, a kind of bottom part of the housing. It has a flat conductor socket, which for instance is U-shaped, extending in a first direction, and which in the installed state at least partially circumferentially grips the flat conductor rail from a transverse direction to the longitudinal direction of the flat conductor rail. The first direction is parallel to the longitudinal direction of the flat conductor rail. In a second direction, which is transverse to the first direction and thus transverse to the longitudinal direction of the flat conductor rail, a plug connector flange of the housing element for inserting and securing a plug connector extends away from the flat conductor socket. The plug connector flange is separated from the flat conductor socket by a wall and has an internal contact part receptacle, that is, a contact part receptacle that is surrounded by the plastic material and is advantageously sheathlike. Between the flat conductor socket and the contact part receptacle, the plastic material forms a wall, in which there is a passage opening which, for passing an electrical contact part extending in the installed state between the flat conductor socket and the contact part receptacle, connects the flat conductor rail and the contact part receptacle to one another. The contact part can for instance be a bimetal contact part, which on the side toward the flat conductor rail for instance has an aluminum material and on the side toward the connector has a copper material and can be embodied as essentially chip-like. Toward the plug connector there is preferably a mounting tab, which can optionally have a smaller cross section than the portion of the contact part located toward the flat conductor rail. The mounting tab can then serve the purpose of directly attaching a counterpart plug contact of a plug connector.

By means of the plug connector flange, the invention makes it possible to make contact with the flat conductor rail using existing plug connectors. Unlike the prior art cited above, a conductor to be connected to the contact part is no longer inserted into the housing and there connected directly with the contact part. Instead, the housing is closed off from the outside, but offers a plug connector interface for making contact via the plug connector flange. Furthermore, because of the spatial separation, achieved by the wall, of the flat conductor rail and the contact part receptacle, good seal-ability of the housing element is made possible. As an injection molded part, the housing element can be manufactured easily, and the passage opening can be jointly molded with it by means of slides or the like.

In an especially advantageous further refinement for sealing off the housing element provides that a seal, for instance of a further, comparatively softer, plastic material, is located on the housing element. In the installed state, this seal can encircle the flat conductor socket and the passage opening in such a way that the contact part is located inside the seal. In other words, the passage opening is also located inside the seal. Additionally, however, a seal on the side toward the plug connector, such as a ring seal, can be located on the plug connector; it seals off the contact-making area between the free end of the contact part and the plug connector contact part. When the plug connector is inserted, the seal toward the plug connector is then immediately positioned correctly.

For simple manufacture, it has proved advantageous if the seal is injection molded onto the plastic material of the housing element. This can be done for instance in a multi-component injection molding process.

If the contact part is embodied in chip-like fashion, the passage opening can advantageously be embodied in slit-like form. Preferably, the slit is approximately as wide and thick as the sheet-metal material comprising the mounting tab on the side toward the plug connection, which in the installed state is meant to be connected to a counterpart contact part of the plug connector.

The flat conductor rail can also be placed in the vehicle on a vehicle part, so that it is advantageous if the contact part receptacle is truncated opposite the flat conductor socket, or in other words is offset in height in the widthwise direction of the housing element. As a result, the plug connector flange can be spaced apart from the vehicle, for instance from a floor of the vehicle, so that the plug connector can be mounted without coming into contact with the vehicle part.

The housing element can also represent only a part of a housing, which part is supplemented for instance with a complementary housing cap. In that case, on a side of the flat conductor socket facing away from the contact part receptacle, at least one hinge portion for connection to a housing cap can be embodied. The hinge portion then forms one leg of the aforementioned U-shape of the housing element.

For connection to the housing cap, it has proved advantageous if, on a side of the flat conductor socket toward the contact part receptacle, at least one securing portion is embodied for clipping to the housing cap. The securing portion can then in some portions form the other leg of the U-shape of the housing element. By means of the securing portion, in the installed state, the contact part can extend all the way through; for that purpose, ideally the flat conductor socket opens into the securing portion and adjoining that into the passage opening. The housing cap can, alternatively, however also be connected to the other housing element via a film hinge. Thus even a one-piece embodiment of the two elements is possible.

The invention refers as well to an electric line arrangement for a vehicle. The electric line arrangement has at least one dimensionally stable flat conductor rail, which is dimensionally stable particularly because of a massive core of an aluminum material and acts as a ground wire or supply line. This arrangement furthermore has a housing element, provided as a housing base, on which a flat conductor socket, extending along a first direction and circumferentially gripping the flat conductor rail, a plug connector flange, which extends in a second direction transverse to the first direction and is furthermore separated by a wall from the flat conductor socket, and an inner contact part receptacle are thus formed in one piece. A passage opening is embodied in the wall and the passage opening connects the flat conductor socket and the contact part receptacle to one another, and through it an electrical contact part, connected to the flat conductor rail and extending between the flat conductor socket and the contact part receptacle, is guided. The contact part is preferably welded to a flat side of the flat conductor rail, but it could also be welded on, without overlapping, laterally to the flat conductor rail, and it thus produces an electrical connection between the flat conductor rail and a plug connector that can be attached to the plug connector flange. Furthermore, the line arrangement has a housing cap, which is articulated on the housing element via a hinge portion, which is located on a side of the flat conductor socket facing away from the contact part receptacle.

The line arrangement can be manufactured in a simple way and enables good sealing of the contacting means or contact part. By means of the plug connector flange, it also makes it possible to make contact with flat conductor rail with the aid of existing plug connectors, without a conductor having to be guided into the housing to the contact part. Instead, the housing can be self-contained, since the contacting between the conductor and the flat conductor rail takes place via the plug connector flange.

In an especially advantageous variant embodiment, the housing element and/or the housing cap can have a seal, which encircles the flat conductor socket and the passage opening in such a way that the contact part is located inside the seal. The contact part is thus located in a sealed-off, dry region of the housing that is formed by the housing element and the housing cap.

The invention further relates to a method for producing or assembling an electric line arrangement for or in a vehicle. The method provides the following steps:

First, an electrical contact part is mounted on a dimensionally stable flat conductor rail, for instance by a welding process. Primarily to save weight, the flat conductor rail is advantageously made from an aluminum material. The contact part can be made of a bimetal, from which one free end is manufactured from a chip-like aluminum material and a further free end is manufactured from a chip-like copper material. Furthermore, a housing element provided as a housing base is furnished with a flat conductor socket, extending in a first direction, as well as a plug connector flange, which extends in a second direction transverse to the first direction and is separated by a wall from the flat conductor socket. The housing element together with the wall is manufactured from a plastic material. After the attachment of the contact part with its one free end, the end facing away from the flat conductor rail is guided or threaded through a passage opening located in the wall. Then, the housing element is located on the flat conductor rail in such a way that it at least partially circumferentially grips the flat conductor rail. In that process a hinge portion of the housing element, for instance, can be located on one (transverse) side of the flat conductor rail and a securing portion of the housing element can be located on the other (transverse) side of the flat conductor rail. For protection and good sealing of the contacting means or contact part between the flat conductor rail and the contact part, a housing cap is mounted on the housing element in such a way that the flat conductor rail and/or the contact part and/or the contacting means is received at least in some portions between the housing cap and the housing element.

BRIEF DESCRIPTION OF THE DRAWINGS

Advantageous exemplary embodiments of the invention are described below with reference to the accompanying drawings. In the drawings.

The drawings are merely schematic illustrations and serve only to explain the invention. Identical elements or elements with the identical effect are provided consistently with the same reference numerals.

DETAILED DESCRIPTION

Figure 1:
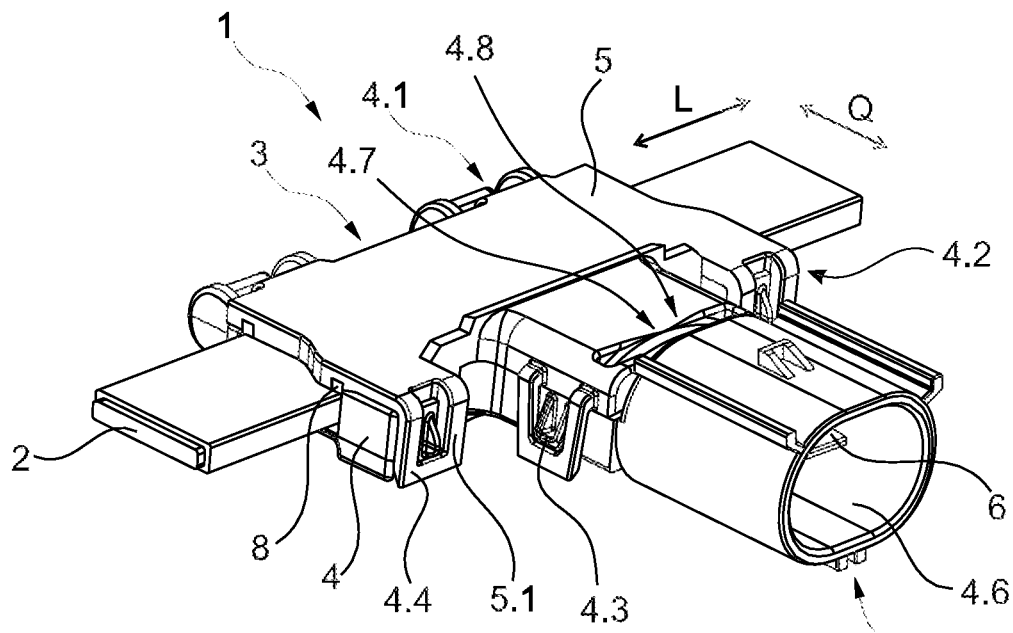
FIG. 1 shows an electric line arrangement of the invention with a housing element of the invention in a perspective view.

FIG. 1 shows an electric line arrangement 1 for a vehicle, in particular for a motor vehicle, in a perspective view. An essentially dimensionally stable, in particular massively embodied, flat conductor rail 2 is provided as a current or ground wire; it forms for example a main line segment of a central vehicle energy supply system.

The flat conductor rail 2 has an essentially massive core of an aluminum material, which is surrounded by an electrical insulation material (not identified by reference numeral). Typically, such a flat conductor rail 2 has a width of approximately 10 mm to approximately 60 mm, preferably from approximately 30 mm to approximately 60 mm. To able to transmit sufficiently high currents, it is advantageous if the flat conductor rail 2 has a height of approximately 0.8 mm to approximately 5 mm, preferably from approximately 1 mm to approximately 2 mm. With such dimensions, the flat conductor rail 2 is more rigid and thus dimensionally stable.

The line arrangement 1 furthermore has a housing 3 produced, for instance injection molded, from a plastic, which housing is put together from two housing elements 4 and 5 that are complementary to one another. The first housing element 4 is a housing base, which partially circumferentially grips the flat conductor rail 2 and is hereinafter called a housing base 4. The second housing element 5 is a housing cap, which covers the circumferentially gripped flat conductor rail 2 and is hereinafter called the housing cap 5. The housing base 4 and housing cap 5 are pivotably connected to one another via a hinge portion 4.1 of the housing base 4, for which purpose the hinge portion 4.1 has hinge pegs (not provided with a reference numeral) meshing with hinge brackets of the housing cap 5. The region 4.1 can also be embodied as a film hinge, with which the housing elements 4 and 5 are connected to one another.

The housing base 4 has a formed-on U-shaped flat conductor socket 4.2, in which the flat conductor rail 2 is received lying flat. In the longitudinal direction L of the flat conductor rail 2, the flat conductor socket 4.2 is defined on one transverse side by the hinge portion 4.1 and on the other transverse side by a securing portion 4.3, or by their plastic wall. A plurality of detent lugs 4.4 are embodied in the securing portion 4.3; in the installed state shown in FIG. 1, they mesh with detent tabs 5.1 of the housing cap 5 and thus embody a clip device. In a direction transverse to the longitudinal direction L, the housing base 4 furthermore has a formed-on plug connector flange 4.5, which is arranged for being placed on and securing a plug connector (not shown). The plug connector flange 4.5 for instance has guide lugs or struts (not provided with a reference numeral) as well as detent lugs, in order to guide and lock the plug connector as it being plugged in. It is furthermore apparent that the plastic material of the plug connector flange 4.5 forms a contact part receptacle 4.6, which in principle involves a hollow chamber in which a section of an electrical contact part 6 is accommodated. The contact part receptacle 4.6 and the flat conductor socket 4.2 are separated from one another by a formed-on wall 4.7, which is formed by the plastic material. The wall 4.7 has a slit-like passage opening 4.8 (see FIG. 2), which discharges on one side into the flat conductor socket 4.2 and on the other into the contact part receptacle 4.6, so that those are connected to one another via the passage opening 4.8.

Figure 2:
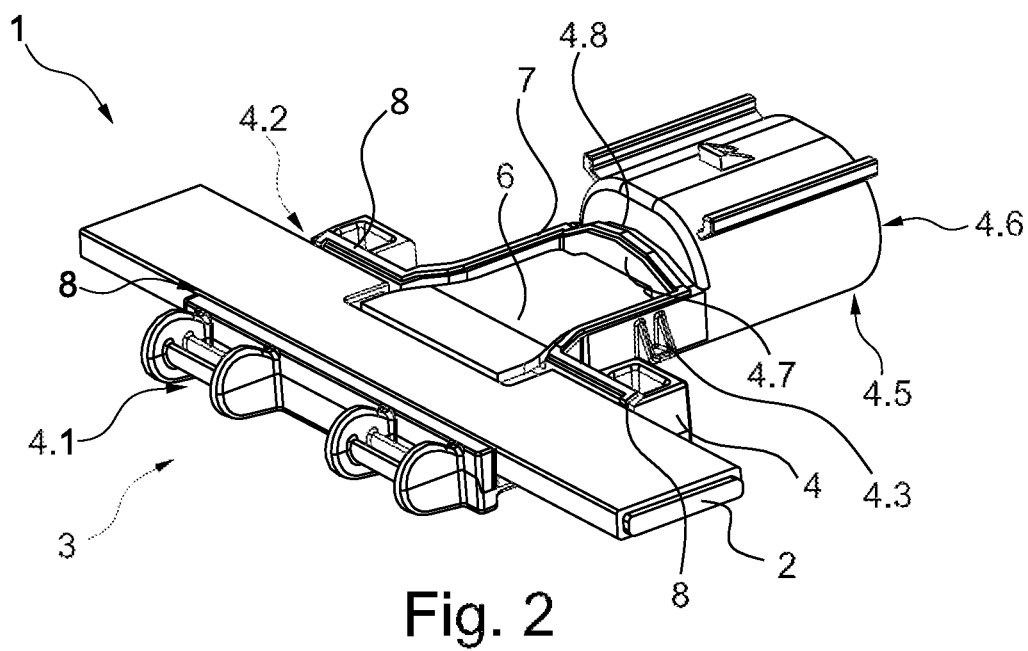
FIG. 2 shows an electric line arrangement of the invention with a housing element of the invention in a perspective view, in which for clearer illustration a housing cap is not shown.

In FIG. 2, the line arrangement 1 is shown without the housing cap 5, for the sake of clearer illustration. As a result, the contact part 6 received inside the housing 3 can be seen better; here, it is manufactured from a bimetal with an aluminum material and a copper material. It extends transversely to the longitudinal direction L, in a transverse direction Q, away from the flat conductor rail 2, and as a result forms a lateral tap of the flat conductor rail 2. The free end of the contact part 6 having aluminum is firmly bonded to a flat side of the flat conductor rail 2, for instance by ultrasonic welding. The opposite free end of the contact part 6, having aluminum, extends transversely to the longitudinal direction L along the housing base 4 as far as the contact part receptacle 4.6, through the passage opening 4.8 of the wall 4.7. On the flat conductor side, that is, in the vicinity of the flat conductor socket 4.2, the contact part 6 is wider here than on the side toward the plug connector, or in other words in the vicinity of the contact part receptacle 4.6; the slit-like passage opening 4.8 has approximately the same width as the narrower portion. As a result, the wall 4.7 forms a stop for the wider portion of the contact part 6. The geometry, that is, the thickness and width, of the narrower portion of the contact part 6 is attuned to current plug contact geometries and amounts to 6.3 mm, for instance. Alternatively, the contact part, with larger conductor cross sections, can also have the same width.

From FIG. 2 it is also seen that on the housing base 4, there is a first seal 7 made of a soft plastic. The seal 7 is embodied around the flat conductor socket 4.2 and the passage opening 4.8, so that the contact part 6 is located, as far as the wall 4.7, inside the seal 7 and thus is protected against the entry of dirt or water. The seal 7 in the installed state is also located on a flat side (toward the bottom in FIG. 2) of the flat conductor rail 2, so that the flat conductor socket 4.2 is also sealed off in the longitudinal direction L of the flat conductor rail 2. A complementarily extending second seal 8 is located on the housing cap 5, which thus in the installed state rests on a flat side (toward the top in FIG. 2) of the flat conductor rail 2 or on its insulating jacket. The seals 7, 8 are injection molded by multi-component injection molding processes to the optionally different plastic material of the housing elements 4, 5.

Figure 3:
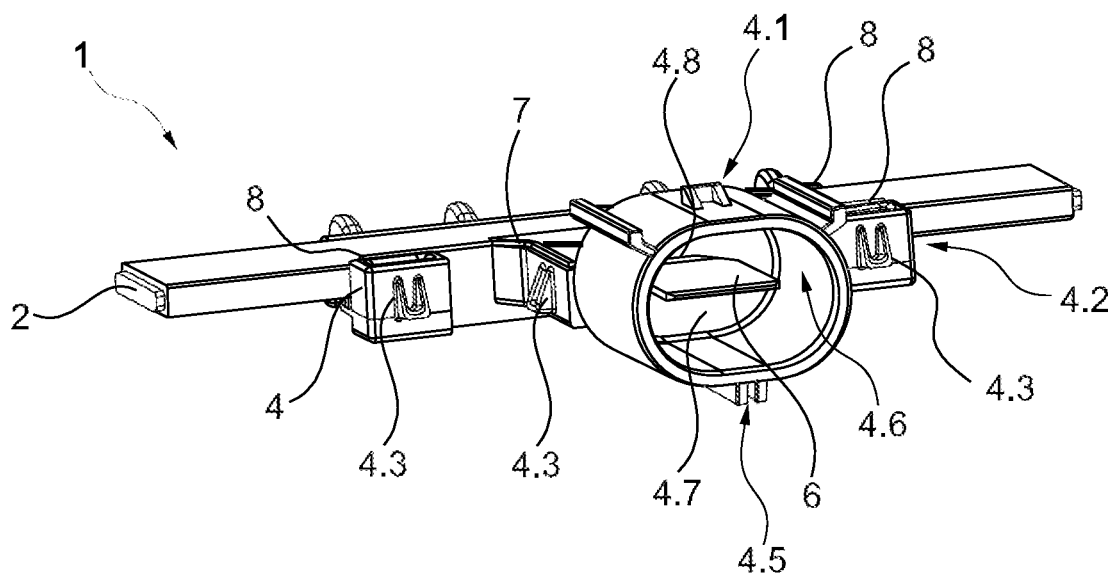
FIG. 3 shows an electric line arrangement of the invention with a housing element of the invention in a perspective view, in which for clearer illustration a housing cap is not shown.

In FIG. 3, which shows the line arrangement of FIG. 2 from a different perspective, it can be seen that the contact part 6 in the vicinity of the contact part receptacle 4.6 is embodied as a mounting tab, which for contact by being plugged in to a counterpart contact part extends into the contact part receptacle 4.6. Furthermore, the guide lugs or struts as well as the detent lugs can be seen even better.

Figure 4:
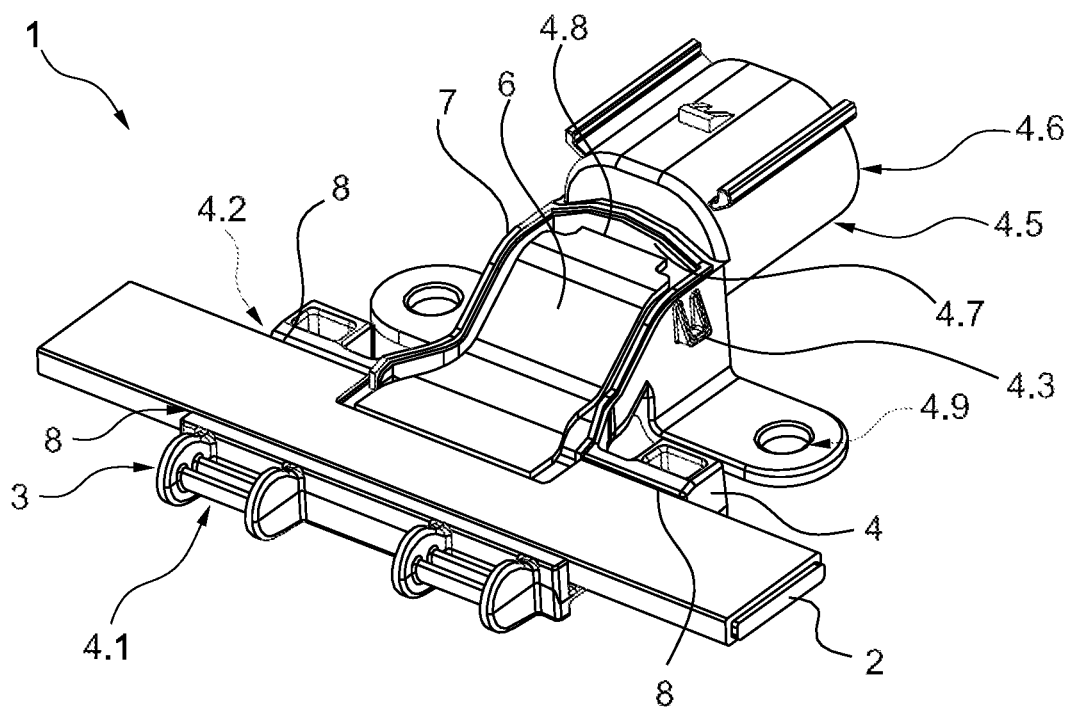
FIG. 4 shows a further embodiment of an electric line arrangement of the invention with a housing element of the invention in a perspective view, in which for clearer illustration a housing cap is not shown.

In FIG. 4, a further embodiment of the line arrangement 1 is shown, in which the plug connector flange 4.5, or the contact part receptacle 4.6, is cropped, in other words offset in height, relative to the flat conductor socket 4.2 in the widthwise direction or vertical direction of the housing base 4. This makes it possible, for instance in installation near the bottom, for the line arrangement 1 in the vehicle to achieve problem-free attachment of the plug connector to the plug connector flange 4.5. Accordingly, the contact part 6 is not straight but instead also cropped. Furthermore, FIG. 4 shows that the housing base 4 has two securing flanges 4.9, which extend parallel to the longitudinal direction L of the flat conductor rail 2 away from the securing portion 4.3. The housing 3 can furthermore be secured in screw-tight fashion, for instance, to the vehicle.

The line arrangement 1 can be produced or installed as described below.

First, the flat conductor rail 2 and the contact part 6 are furnished, to which end the contact part 6 is manufactured for instance by roller plating, and the flat conductor rail 2 is manufactured for instance by extrusion. In addition, the flat conductor rail 2 is optionally provided with the insulating jacket. In the contact region between these two contact partners, the flat conductor rail 2 is either insulated, or the insulating jacket has been recessed there. Next, the contact part 6 is welded with a flat side onto a flat side of the flat conductor rail 2, which can be done by laser welding, for instance.

Then, at least the first housing element 4, provided as the housing base, is furnished with the flat conductor socket 4.2 as well as the plug connector flange 4.5. Upon attaching the housing base 4 to the flat conductor rail 2, first the free end, which is not connected, of the contact part 6 and which is embodied as a mounting tab, is introduced into the passage opening 4.8, which then protrudes into the contact part receptacle 4.6 and can be contacted there by a counterpart contact part of a plug connector. Then the end of the housing base, opposite the plug connector flange 4.5, on which base the hinge portion 4.1 is embodied, is located around the flat conductor rail 2 in such a way that the flat conductor rail 2 rests with a flat side on the flat conductor socket 4.2, and the two narrow sides of the flat conductor rail 2 are circumferentially gripped.

After that, the housing cap 5 is attached pivotably on the hinge portion 4.1 by means of clipping the hinge hooks to the hinge pegs and is closed on the securing portion 4.3 by clipping the detent tongues to the detent hooks into a closed state, the installed state.

LIST OF REFERENCE NUMERALS

1 Electric line arrangement
2 Flat conductor rail
3 Housing
4 First housing element (for instance, housing base)
4.1 Hinge portion
4.2 Flat conductor socket
4.3 Securing portion
4.4 Detent lug
4.5 Plug connector flange
4.6 Contact-part receiving chamber
4.7 Wall
4.8 Passage opening
4.9 Securing flange
5 Second housing element (for instance, housing cap)
5.1 Detent tab
6 Electric contact part (for instance, plug contact)
7 First seal
8 Second seal
L Longitudinal direction of the flat conductor rail 2
Q Transverse direction

The invention claimed is:

1. A housing element comprising:
   a flat conductor rail socket extending in a first direction, the flat conductor rail socket configured to accommodate a flat conductor rail passing through and out of the flat conductor rail socket;
   a plug connector flange extending in a second direction transverse to the first direction and including an interior contact part receptacle;
   a wall separating the flat conductor rail socket and the plug connector flange; and
   a passage opening located in the wall and connecting the flat conductor rail socket to the contact part receptacle, wherein the passage opening is configured to receive an electrical contact part passing through the passage opening and extending between the flat conductor rail socket and the contact part receptacle.

2. The housing element of claim 1, wherein the passage opening comprises a slit.

3. The housing element of claim 1, wherein the contact part receptacle is offset from the flat conductor rail socket in a third direction transverse to both the first and second directions.

4. The housing element of claim 1, wherein the flat conductor rail socket comprises a hinge portion on a side of the flat conductor rail socket facing away from the contact part receptacle in the second direction, wherein the hinge portion is connected to a housing cap.

5. The housing element of claim 1, wherein the flat conductor rail socket comprises a securing portion on a side facing toward the contact part receptacle in the second direction, wherein the securing portion is configured to clip to a housing cap.

6. The housing element of claim 1, further comprising a seal positioned along at least one of the flat conductor rail socket or the passage.

7. The housing element of claim 6, wherein the seal is injection molded onto a plastic material of the housing element.

8. An electric line arrangement for a vehicle, comprising:
   a dimensionally-stable flat conductor rail configured as a ground wire or supply conductor;
   a housing element including:
      a flat conductor rail socket extending along a first direction and circumferentially gripping the flat conductor rail, the flat conductor rail socket configured to accommodate a flat conductor rail passing through and out of the socket;
      a plug connector flange extending in a second direction transverse to the first direction and including an interior contact part receptacle;
      a wall separating the flat conductor rail socket and the plug connector flange;
      a passage opening, located in the wall and connecting the flat conductor rail socket to the contact part receptacle;
      an electrical contact part connected to the flat conductor rail and extending between the flat conductor rail socket and the contact part receptacle; and
      a housing cap connected to the housing element via a hinge portion on a side of the flat conductor rail socket facing away from the contact part receptacle in the second direction.

9. The line arrangement of claim 8, wherein at least one of the housing elements or the housing cap comprises a seal positioned along at least one of the flat conductor rail socket or the passage opening.

10. The electric line arrangement of claim 8, wherein the flat rail conductor has a width comprising 10 mm to 60 mm, and a height comprising 0.8 mm to 5 mm.

11. The electric line arrangement of claim 8, wherein the electrical contact part comprises aluminium and copper.

12. The electrical line arrangement of claim 8, wherein:
the rail comprises an insulating jacket; and
the insulating jacket is recessed in a contact region between the rail and the electrical contact part.

13. The electrical line arrangement of claim 8, wherein:
the electrical contact part comprises a first portion and a second portion, wherein:
the first portion is wider than the second portion;
the first portion is connected to the flat conductor rail; and
the second portion is disposed in the contract part receptacle.

14. The electrical line arrangement of claim 13, wherein the passage opening comprises a slit having a width approximately the same as a width of the second portion.

15. A method for producing an electric line arrangement for a vehicle, comprising:
attaching an electrical contact part to a dimensionally-stable flat conductor rail;
furnishing a housing element including:
a flat conductor rail socket extending in a first direction, the flat conductor rail socket configured to accommodate a flat conductor rail passing through and out of the socket;
a plug connector flange extending in a second direction transverse to the first direction and including an interior contact part receptacle;
a wall separating the flat conductor rail socket and the plug connector flange; and
a passage opening located in the wall and connecting the flat conductor rail socket to the contact part receptacle;
passing a free end of the contact part through the passage opening;
positioning the housing element on the flat conductor rail in such a way that the flat conductor rail is at least partially circumferentially gripped by the housing element; and
positioning a housing cap on the housing element in such way that at least some portion of the flat conductor rail is between the housing cap and the housing element.

16. The method of claim 15, wherein attaching the electrical contact part further comprises welding the part to the flat conductor rail.

17. The method of claim 15, further comprising:
providing a seal between the housing element and the housing cap; and
positioning the seal along at least one of the flat conductor rail socket and the passage opening.

18. The method of claim 15, wherein:
the housing element comprises a detent lug; and
the housing cap comprises a detent tab; and
the method further comprises clipping the housing cap to the housing element.

19. The method of claim 15, wherein:
the rail comprises an insulating jacket; and
the method further comprises recessing the insulating jacket in a contact region between the electrical contact part and the flat conductor rail.

20. The method of claim 15, further comprising:
plugging in a counterpart contact into the contact part receptacle.

\* \* \* \* \*